(12) United States Patent
Panigrahi et al.

(10) Patent No.: US 9,974,094 B2
(45) Date of Patent: May 15, 2018

(54) METHOD AND SYSTEM FOR SCHEDULING INTERFERENCE AWARE OPTIMAL UPLINK FOR DEVICE TO-DEVICE COMMUNICATION UNDERLYING LTE NETWORKS

(71) Applicant: Tata Consultancy Services Limited, Mumbai (IN)

(72) Inventors: Bighnaraj Panigrahi, Whitefield (IN); Hemant Kumar Rath, Whitefield (IN); Anantha Simha, Whitefield (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 238 days.

(21) Appl. No.: 14/934,831

(22) Filed: Nov. 6, 2015

(65) Prior Publication Data

US 2016/0135211 A1 May 12, 2016

(30) Foreign Application Priority Data

Nov. 6, 2014 (IN) .......................... 3496/MUM/2014

(51) Int. Cl.
*H04W 72/12* (2009.01)
*H04W 4/00* (2018.01)
(Continued)

(52) U.S. Cl.
CPC ....... *H04W 72/1268* (2013.01); *H04W 4/005* (2013.01); *H04W 72/121* (2013.01); *H04W 74/0833* (2013.01); *H04W 76/023* (2013.01)

(58) Field of Classification Search
CPC .......................... H04W 72/1268; H04W 4/005
(Continued)

(56) References Cited

U.S. PATENT DOCUMENTS

| 2011/0098054 A1* | 4/2011 | Gorokhov | H04B 7/024 455/452.1 |
| 2011/0222455 A1* | 9/2011 | Hou | H04W 52/267 370/311 |

(Continued)

OTHER PUBLICATIONS

Janis P. et al, Interferenc—Aware Resource Allocation for Device-to-Device Radio Underlaying Cellular Networks Apr. 26-29, 2009, IEEE, XP031474558, pp. 1-5.*

*Primary Examiner* — Samina Choudhry
(74) *Attorney, Agent, or Firm* — Hamre, Schumann, Mueller & Larson, P.C.

(57) ABSTRACT

A method and system is provided for scheduling interference aware optimal uplink for device-to-device communication underlying LTE networks. The present application provides a method and system for scheduling interference aware optimal uplink for device-to-device communication underlying LTE networks, comprises registering a plurality of users equipment (UEs) with a single cell with one Evolved Node B (eNB) over the Long Term Evolution (LTE) network; initiating connection by the plurality of users equipment (UEs) with Evolved Node B (eNB); discovering device-to-device (D2D) communication between the actively connected plurality of users equipment (UEs); segregating the actively connected plurality of users equipment (UEs) in device-to-device and cellular users by the Evolved Node B (eNB); and scheduling the two-phase interference aware optimal uplink for device-to-device communication for segregated actively connected device-to-device (D2d) and cellular users by the Evolved Node B (eNB), underlying the Long Term Evolution (LTE) network.

18 Claims, 3 Drawing Sheets

(51) Int. Cl.
*H04W 74/08* (2009.01)
*H04W 76/02* (2009.01)

(58) Field of Classification Search
USPC .......................................................... 370/329
See application file for complete search history.

(56) References Cited

U.S. PATENT DOCUMENTS

2013/0183971 A1* 7/2013 Tamaki ............. H04W 36/0061
　　　　　　　　　　　　　　　　　　　　　455/436
2015/0049624 A1* 2/2015 Sun ..................... H04W 72/082
　　　　　　　　　　　　　　　　　　　　　370/252

* cited by examiner

US 9,974,094 B2

METHOD AND SYSTEM FOR SCHEDULING INTERFERENCE AWARE OPTIMAL UPLINK FOR DEVICE TO-DEVICE COMMUNICATION UNDERLYING LTE NETWORKS

CLAIM OF PRIORITY

This application claims the benefit of priority of India Patent Application Serial No. 3496/MUM/2014, filed on 6 Nov. 2014, the benefit of priority of which is claimed hereby, and which is incorporated by reference herein in its entirety.

FIELD OF THE INVENTION

The present subject matter relates to computing devices and, particularly but not exclusively, to methods and system for device-to-device communication under Long Term Evolution (LTE) networks.

BACKGROUND OF THE INVENTION

Mobile users in today's cellular networks, for example, 2G, 3G, 4G, use high data rate services, such as video sharing, gaming, and proximity aware social networking, in which they could potentially be in range for direct communications between two or more mobile devices or user equipment (UEs). Due to fixed infrastructure based communication in a cellular system, many a times, although the mobile users are communicating, or sharing files, in close proximity, for example, in a stadium, club, office, homes, etc., they require to follow the existing cellular transmission procedures, i.e., uplink from a sender mobile to a base station (base transceiver station (BTS) or inter-Evolved Node B (eNB)), followed by downlink from an eNB node to a receiver mobile. This is not only complex, but also resource consuming. To avoid this complexity in case of close proximity users and to improve the utilization of the resources (hence the spectral efficiency), device-to-device (D2D) communication has been generally proposed. In the D2D communication, the mobile devices can directly communicate between themselves using the same cellular resources (sub-carrier/channel/Resource Blocks (RBs)) as the peer-to-peer communication, under the guidance of the eNB node. This helps in direct transfer of data between two close-by mobile devices at a higher rate with less transmission power.

SUMMARY OF THE INVENTION

Before the present methods, systems, and hardware enablement are described, it is to be understood that this invention is not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

The present application provides a method for an interference aware optimal device-to-device (D2D) communication and scheduling underlying Long Term Evolution (LTE) networks.

The present application provides a method and system for an interference aware optimal device-to-device (D2D) communication and scheduling underlying a Long Term Evolution (LTE) network. The system for an interference aware optimal device-to-device (D2D) communication and scheduling underlying a Long Term Evolution (LTE) network comprising a single cell with one Evolved Node B (eNB) communicatively coupled to a plurality of users equipment (UEs) over the Long Term Evolution (LTE) network adapted for executing registering a plurality of users equipment (UEs) with a single cell with one Evolved Node B (eNB) over the Long Term Evolution (LTE) network wherein each of the plurality of users equipment (UEs) is capable of transmitting at least one data packet of multiple flows through the Evolved Node B (eNB); initiating connection by the plurality of users equipment (UEs) with Evolved Node B (eNB) by starting random access procedure; discovering device-to-device (D2D) communication between the actively connected plurality of users equipment (UEs) by collecting location and channel information of the actively connected plurality of users equipment (UEs) by the Evolved Node B (eNB) through SRS packets; segregating and classifying the actively connected plurality of users equipment (UEs) into device-to-device (D2D) and cellular users by the Evolved Node B (eNB) by utilizing collected location and channel information of the actively connected plurality of users equipment (UEs); and scheduling the two-phase interference aware optimal uplink for device-to-device communication for segregated actively connected device-to-device (D2d) and cellular users out of the plurality of users equipment (UEs) by the Evolved Node B (eNB), underlying the Long Term Evolution (LTE) network.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
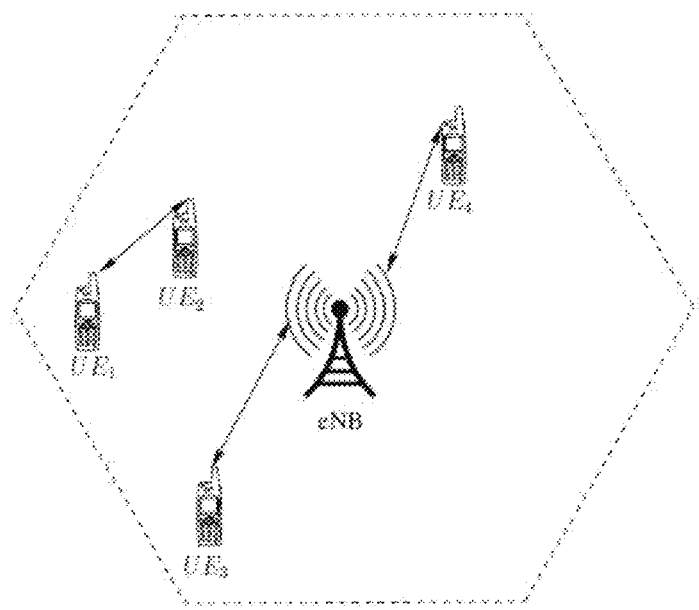
FIG. 1 illustrates single cell Long Term Evolution (LTE) network, according to an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like, represent various processes which may be substantially represented in computer readable medium and so executed by a computer or processor, whether or not such computer or processor is explicitly shown.

DETAILED DESCRIPTION OF THE INVENTION

Some embodiments of this invention, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

In a device-to-device (D2D) communication, a plurality of users equipment (UEs) such as mobile devices can directly communicate between themselves using the same cellular resources, including sub-carrier, channel, Resource Blocks (RBs) etc. as the peer-to-peer communication, under the guidance of an inter-Evolved Node B (eNB) node. This helps in direct transfer of data between two close-by mobile devices at a higher rate with less transmission power.

Further, since the device-to-device (D2D) communication requires Evolved Node B (eNB) intervention, appropriate modification is required for both uplink and downlink scheduling, such that channel reuse can be made possible. This requires the knowledge of a channel condition and a position of the mobile devices at the Evolved Node B (eNB), which can be made available by the use of control messages and possible use of Global Positioning System (GPS) or any other efficient localization techniques. Therefore, the Evolved Node B (eNB) can identify whether any mobile pair is eligible to be classified as device-to-device (D2D) pairs, wherein users who are in close proximity and relatively far away from Evolved Node B (eNB) to cause any problem to ongoing uplink/downlink. Once the Evolved Node B (eNB) identifies the device-to-device (D2D) pairs, the Evolved Node B (eNB) can intimate the device-to-device (D2D) pairs to communicate directly through scheduling process and the Evolved Node B (eNB) can use the same channel for any other mobile device's uplink communication, or can also be reused by other non-interfering device-to-device (D2D) pairs as well.

In general, the device-to-device (D2D) communication using cellular spectrum promises three types of gains: (i) reuse gain, wherein both cellular as well as device-to-device (D2D) users can use radio resources simultaneously, thereby improving the reuse factor, (ii) proximity of the User Equipment (UEs) implies extremely high bit rates, low delays and low power consumption, and (iii) use of a single link in a device-to-device (D2D) mode instead of combination of an uplink and a downlink ensures hop gain. In an example, the device-to-device (D2D) communication will not only help cellular service providers by maximizing the reuse factor, throughput, load balance, etc., but also will provide lower delay and higher battery life to mobile users. Moreover, the device-to-device (D2D) communication can enable multi-hop relays in cellular networks, multi-casting, peer-to-peer communication, video dissemination, machine-to-machine (M2M) communication, cellular data offloading.

Generally, it is assumed that cellular operators as well as mobile users will be greatly benefited by the device-to-device (D2D) communication and will show interest to incorporate the changes. Further, it is also generally assumed that a cellular receiver (inter-Evolved Node B (eNB)) is not only aware of a Channel State Information (CSI) between the transmitter-receiver pairs, but also of interference links, such as links between a device-to-device (D2D) transmitter and the cellular receiver (eNB) and/or a cellular transmitter (e.g. cellular UE) and a device-to-device (D2D) receiver. Since 3rd Generation Partnership Project (3GPP) main focus is to design a Long Term Evolution (LTE) enabled proximity services for emergency situations in which two mobile devices can directly communicate even when the network is down without operators' intervention, much development to provide device-to-device (D2D) as a commercial service has so far not gathered attention. Since the operators require control over the device-to-device (D2D) services for billing, regulatory, and security prospective, it is necessary to bring commercial device-to-device (D2D) into 3rd Generation Partnership Project (3GPP) standard. Moreover, better Quality of Experience (QoE) has to be guaranteed to device-to-device (D2D) users, without which device-to-device (D2D) users may turn to traditional device-to-device (D2D) technologies, such as Bluetooth, Infrared, etc., which are free but with lower speed and compromised security.

In general, three kinds of resource sharing modes could be utilized: (i) device-to-device (D2D) mode reusing cellular resources, wherein simultaneous device-to-device (D2D) and cellular transmission on same Resource block (RB), (ii) device-to-device (D2D) mode using orthogonal resources, wherein both device-to-device (D2D) and cellular transmissions do not overlap, and (iii) cellular mode in which the device-to-device (D2D) pair communicates through the cellular Evolved Node B (eNB), wherein no separate device-to-device (D2D) pairs defined. A heuristic Mode Selection (MS) algorithm may also be proposed for multi-cell scenario which uses probing signals between the device-to-device (D2D) transmitter and receiver to estimate Signal-to-Interference and Noise Ratio (SINR) and the Evolved Node B (eNB) has the task to estimate the transmit power, the Signal-to-Interference and Noise Ratio (SINR) and throughput in each possible communication modes.

In an embodiment of the present invention, a method and system is proposed for scheduling an interference aware optimal uplink for device-to-device communication underlying Long Term Evolution (LTE) networks.

In accordance to the present subject matter, various embodiments and implementations describe a novel scheme for device-to-device (D2D) communications under Long Term Evolution (LTE). In a first step, an Evolved Node B (eNB) classifies device-to-device (D2D) and cellular users. In second step, the Evolved Node B (eNB) schedules the D2D and cellular users optimally such that maximal resource utilization including reuse of the available resources can be achieved. Further, the present subject matter also attempts to bring out the necessary standardization needs to facilitate device-to-device (D2D) communications under 3rd Generation Partnership Project (3GPP).

Referring to FIG. 1 illustrates single cell Long Term Evolution (LTE) network, according to an embodiment of the present subject matter.

In another embodiment of the present invention, a system for scheduling an interference aware optimal uplink for device-to-device (D2D) communication underlying a Long Term Evolution (LTE) network is described. The system for scheduling an interference aware optimal uplink for device-to-device (D2D) communication underlying a Long Term Evolution (LTE) network comprising a single cell with one eNB communicatively coupled to a plurality of users equipment (UEs) over the Long Term Evolution (LTE) network. The plurality of users equipment (UEs) is selected from a group comprising of static or mobile user equipment. The mode of communications between the actively connected plurality of users equipment (UEs) is selected from a group comprising directly with each other and through the Evolved Node B (eNB). In the both the modes of communication, the Evolved Node B (eNB) has the sole responsibility to classify the mode of communications and schedules the plurality of users equipment (UEs). In the present embodiment, two sets of active users: cellular users, such as communication between $UE_3$ and $UE_4$, as illustrated in FIG. 1, which send their packets to their destination nodes through Evolved Node B (eNB) and device-to-device (D2D) users such as communication between $UE_1$ and $UE_2$, as illustrated in FIG. 1, who transmit their packets to their destinations directly. Each of the plurality of users equipment (UEs) is capable of transmitting data packets of multiple flows through the Evolved Node B (eNB). The plurality of users equipment (UEs) initiate connections with the Evolved Node B (eNB) by starting random access procedure. Further, one or more request messages are collected from the plurality of users equipment (UEs) by the Evolved Node B (eNB). Though the Long Term Evolution (LTE) supports both contention resolution and polling based techniques. The one or more request messages from the plurality of users equipment (UEs) are collected by the Evolved Node B (eNB) using contention based techniques.

In another embodiment of the present invention, said system for scheduling an interference aware optimal uplink for device-to-device (D2D) communication underlying a Long Term Evolution (LTE) network is adapted for registering a plurality of users equipment (UEs) with a single cell with one Evolved Node B (eNB) over the Long Term Evolution (LTE) network wherein each of the plurality of users equipment (UEs) is capable of transmitting at least one data packet of multiple flows through the Evolved Node B (eNB).

In another embodiment of the present invention, said system for scheduling an interference aware optimal uplink for device-to-device (D2D) communication underlying a Long Term Evolution (LTE) network is adapted for initiating connection by the plurality of users equipment (UEs) with Evolved Node B (eNB) by starting random access procedure.

In another embodiment of the present invention, said system for scheduling an interference aware optimal uplink for device-to-device (D2D) communication underlying a Long Term Evolution (LTE) network is adapted for discovering device-to-device (D2D) communication between the actively connected plurality of users equipment (UEs) by collecting location and channel information of the actively connected plurality of users equipment (UEs) by the Evolved Node B (eNB) through SRS packets.

In another embodiment of the present invention, said system for scheduling an interference aware optimal uplink for device-to-device (D2D) communication underlying a Long Term Evolution (LTE) network is adapted for segregating the actively connected plurality of users equipment (UEs) in device-to-device and cellular users by the Evolved Node B (eNB) by utilizing collected location and channel information of the actively connected plurality of users equipment (UEs).

In another embodiment of the present invention, said system for scheduling an interference aware optimal uplink for device-to-device (D2D) communication underlying a Long Term Evolution (LTE) network is adapted for scheduling the two-phase interference aware optimal uplink for device-to-device communication for segregated actively connected device-to-device (D2d) and cellular users out of the plurality of users equipment (UEs) by the Evolved Node B (eNB), underlying the Long Term Evolution (LTE) network.

Figure 2:
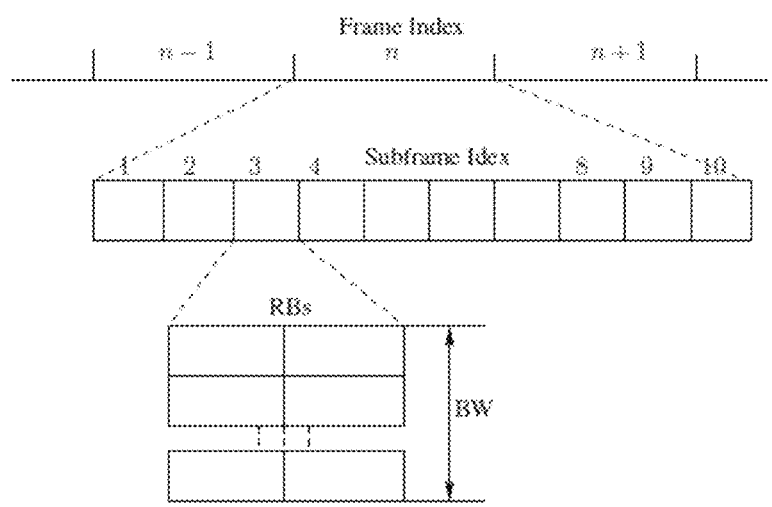
FIG. 2 illustrates a LTE uplink Frequency Division Duplexing (FDD) frame structure, according to an embodiment of the present subject matter.

Referring to FIG. 2 illustrates a LTE uplink Frequency Division Duplexing (FDD) frame structure, according to an embodiment of the present subject matter.

In another embodiment of the present invention, the scheduling the two-phase interference aware optimal uplink for device-to-device communication underlying the Long Term Evolution (LTE) network is enabled by a Long Term Evolution (LTE) uplink Frequency Division Duplexing (FDD) frame structure. The Long Term Evolution (LTE) uplink Frequency Division Duplexing (FDD) frame structure further comprises of dividing a frame length in to a plurality of sub-frames, for instance, frame length $T_f=10$ ms comprised of 10 sub-frames of 1 ms duration each. Further, dividing the plurality of sub-frames into at least two slots, wherein each sub-frame is further divided into two slots of duration 0.5 ms each. Furthermore, dividing available system bandwidth into a plurality of Resource Blocks (RBs) corresponds to at least one slot, wherein available system bandwidth is divided into a number of Resource Blocks (RBs) which can vary between 6 to 110; each RB is of 180 kHz bandwidth (twelve sub-carriers of 15 kHz each) corresponds to one slot of 0.5 ms duration.

In an exemplary embodiment of the present invention, a wireless channel between the plurality of users equipment (UEs) and the Evolved Node B (eNB) is frequency selective and time varying in nature and is modeled through Log-normal shadowing (channel is fixed for M frames, M≥1) and Rayleigh fading (channel changes in every frame). As per the 3rd Generation Partnership Project (3GPP) standard, each of the plurality of users equipment (UEs) reports uplink channel condition using a Sounding Reference Signal (SRS). The method as claimed in claim 1, further comprises of assigning adaptive modulation and coding rates to each of the plurality of users equipment (UEs) by the Evolved Node B (eNB) based on a signal-to-interference-plus-noise ratio (SINR) received at the Evolved Node B (eNB). Although the maximum capacity for a resource block (RB) is constant, which is corresponding to the best modulation and coding scheme, different users may have different effective capacities, which could vary from less than or equal to the maximum capacity depending on their channel conditions. In an implementation, a prime objective is to schedule the plurality of users equipment (UEs) for the resource block (RB) so as to achieve maximum effective throughput.

In another embodiment of the present invention, said system for scheduling an interference aware optimal uplink for device-to-device (D2D) communication underlying a Long Term Evolution (LTE) network is adapted for discovering device-to-device (D2D) communication between the actively connected plurality of users equipment (UEs) by collecting location and channel information of the actively connected plurality of users equipment (UEs) by the Evolved Node B (eNB) through SRS packets. By using location information of the sender and receiver, their estimated channel characteristics, the Evolved Node B (eNB) segregates the actively connected plurality of users equipment (UEs) in device-to-device and cellular users.

In an exemplary embodiment of the present invention, let $Pt_{max}$ be the maximum transmit power of an users equipment out of the plurality of users equipment (UEs). Let $Pt_i$ be the transmission power of $UE_i$ such that $Pt_i \leq Pt_{max}$. Let $Pr_{i-j}$ be the received power from $UE_i$ at node j (node j can either be the eNB or $UE_j$). The channel between the transmitter and the receiver is assumed to be frequency selective and time varying in nature can be modeled as explained before. Signal-to-Interference and Noise Ratio (SINR) at node j can be computed as:

$$SINR_{i-j} = \frac{Pr_{i-j}}{N_{i-j} + Pr_{i*-j}} \quad (1)$$

where i* is any interfering cellular UE and $N_{i-j}$ is the noise power. For successful communication, $SINR_{i-j} > SINR_{th}$, where $SINR_{th}$ is the minimum SINR required as per the standards. Since the value of the received SINR depends upon the transmission power, the received interference and noise power, transmission power should be such that $SINR_{th}$ condition is satisfied. In addition, minimal or negligible interference condition has to be satisfied at the non-intending receiving nodes (Evolved Node B (eNB) for device-to-device (D2D) communication and device-to-device (D2D) receiver for cellular communication). To ensure this, we define the maximum SINR: $SINR_{lb}$ limit to avoid interference as a measure ($SINR_{lb} \ll SINR_{th}$).

The Evolved Node B (eNB) which schedules the plurality of users equipment (UEs) needs to know the Signal-to-Interference and Noise Ratio (SINR) condition of the plurality of users equipment (UEs). Since interference and noise power are dynamic in nature, statistical techniques should be used at the Evolved Node B (eNB) to estimate the Signal-to-Interference and Noise Ratio (SINR) values. In accordance with the present subject matter, the Evolved Node B (eNB) can compute the expected Signal-to-Interference and Noise Ratio (SINR) that can be received between any the users equipment (UE)-Evolved Node B (eNB) or Evolved Node B (eNB)-Evolved Node B (eNB) at any location. Further, the following conditions are used to declare a pair as either device-to-device (D2D) or cellular: pair i-j can be considered as device-to-device (D2D) in the presence of another cellular pair u-v through Evolved Node B (eNB) (node e), if and only if:

$E(SINR_{i-j}) \geq SINR_{th} \& E(SINR_{i-e}) < SINR_{lb}$, $E(SINR_{u-j}) < SINR_{th} \& E(SINR_{u-e}) \geq SINR_{th}$. (2)

In other words, to declare a pair as device-to-device (D2D), (i) intended Signal-to-Interference and Noise Ratio (SINR) at the receivers ($E(SINR_{i-j})$) and ($E(SINR_{u-e})$) should be above the threshold Signal-to-Interference and Noise Ratio (SINR), (ii) interference power received at the device-to-device (D2D) receiver j from the cellular transmitter u as well as interference power received at the Evolved Node B (eNB) (node e) from the device-to-device (D2D) transmitter i should be negligible. In an example, the device-to-device (D2D) pairs always belong to a single cell scenario. In the scenario where the receiver belongs to a different cell, the connection will be treated as a cellular pair only.

The reverse communications (i.e., j-i and v-u) is treated separately by the Evolved Node B (eNB). For device-to-device (D2D) communications only the uplink frames are used and uplink scheduling is considered for two reasons (i) the downlink spectrum is almost deterministically occupied by the Evolved Node B (eNB) for downlink data and control messaging, etc., (ii) Evolved Node B (eNB) transmits with high power so that the communication is more vulnerable to interference. For cellular users both uplink and downlink scheduling are considered. Therefore, device-to-device (D2D): i-j and j-i communications can possible in two different uplink frames, whereas for cellular communications both uplink as well as downlink communications can be possible simultaneously.

In another embodiment of the present invention, the segregated actively connected device-to-device (D2D) and cellular users out of the plurality of users equipment (UEs) by the Evolved Node B (eNB), underlying the Long Term Evolution (LTE) network are scheduled for the two-phase interference aware optimal uplink for device-to-device communication. In a first phase, all the cellular users are scheduled for the plurality of Resource Blocks (RBs) set in the Long Term Evolution (LTE) frame so as to optimize the effective throughput. In a second phase, valid and non-interfering device-to-device (D2D) users are scheduled along with the already scheduled cellular users for the plurality of Resource Blocks (RBs) with no or minimal total interference; i.e., interference by the uplink cellular user at the device-to-device (D2D) receiver and also interference at the Evolved Node B (eNB) (cellular receiver) by the device-to-device (D2D) transmitter are below $SINR_{lb}$. For simultaneous device-to-device (D2D) and cellular communication, the plurality of users equipment (UEs) should support variable transmission power. The idea here is to schedule a device-to-device (D2D) transmission over cellular transmission such that the two transmissions do not interfere with each other.

In an exemplary embodiment of the present invention, let there be m number of resource block (RB) that need to be scheduled among k number of cellular UEs (k>>m). Let $X_{pq}$ be a Boolean variable ($X_{pq} = 0/1$) which indicates that $q^{th}$ RB is assigned to $UE_p$. Let $T_{pq}$ be the capacity that can be achieved by $UE_p$ if $q^{th}$ RB is assigned to it. The Evolved Node B (eNB) needs to obtain the resource block (RB)—the plurality of users equipment (UEs) mapping by solving the following optimization problem, such that maximum capacity is achieved. Note that, there will be m·k the plurality of users equipment (UEs)-resource block (RB) combinations out of which it is required to find a set of m combinations ($X_{pq}$) which give optimum capacity (total throughput from all RBs):

$$\text{Maximize} \sum_{p,q} T_{pq} \times X_{pq},$$

subject to $$\sum_{p=1}^{k} X_{pq} \leq 1: \forall\, q, \quad (3)$$

$$\sum_{p,q} X_{pq} \leq m: \forall\, p, q.$$

This is a Binary Integer Optimization problem and may be solved using mathematical simulators such as Matlab. The first constraint ensures that each resource block (RB) may be assigned to at most one of the k users and the last constraint ensures that the total number of active users cannot be more than the number of available resource block (RB). The solution to the above optimization problem will give m $X_{pq}$s as 1 (others are 0) such that the total throughput is maximum. If multiple resource block (RB) of same Long Term Evolution (LTE) uplink frame are assigned to a particular user equipment out of the plurality of users equipment (UEs), then they should be consecutive. The solution technique of the above optimization problem should ensure this.

Once m out of k cellular users are assigned to m available RBs using Eq. (3), the eNB then schedules the device-to-device (D2D) pairs such that reuse of the resource block (RB) can be made possible. Using a similar optimization problem as in Eq. (3) the Evolved Node B (eNB) now schedules the device-to-device (D2D) pairs such that the interference at both the device-to-device (D2D) receivers as well as at the cellular receiver, Evolved Node B (eNB) in the uplink, are minimum as illustrated in Equation (2). The optimization problem then can also be solved using Binary Integer Optimization technique is formulated as:

$$\text{Minimize } I_{rp} \times Y_{rp},$$

subject to $$\sum_{r=1}^{} Y_{rp} \leq 1: \forall\, p, \quad (4)$$

$$\sum_{r,p} X_{rp} \leq m: \forall\, r, p,$$

where $I_{rp}$ is the sum of interference received at both the receivers (device-to-device (D2D) as well as Evolved Node B (eNB)), $Y_{rp}=0/1$ is a Boolean variable which indicates that the resource block (RB) assigned to $UE_p$ is re-assigned to $UE_r$, which is a device-to-device (D2D) transmitter. Further, Evolved Node B (eNB) can compute the optimal transmission power of device-to-device (D2D) users (and cellular users also) such that the interference condition is satisfied as illustrated in Equation (2).

The description herein now provides a brief out-line of the two-phase scheduling scheme. Note that, the discovery and scheduling are continuous processes and are repeated in every frame; a device-to-device (D2D) user in the present frame can become a cellular user in any future frame and vice versa due to mobility and channel conditions.

| Algorithm 1: Two-Phase Uplink Scheduling Scheme for LTE Networks |
| --- |
| 1: Input: Number of RBs = m |
| 2: while TRUE do |
| 3:    Frame Index: n ← 1 |
| 4:    Classify D2D and Cellular pairs using the condition Eq. (2). |
| 5:    Solve Eq. (3) to assign RBs to the cellular pairs. |
| 6:    Assign RBs (reuse) to the D2D pairs using Eq. (4) such that interference is minimum. |
| 7:    n ← n + 1 |
| 8: end while |

Note that, though in description provided herein, downlink scheduling is not considered, the proposed scheme can also be extended for the downlink case.

In the description hereinafter, the proposed device-to-device (D2D) communication mechanism is critically analyzed for a possible deployment using 3rd Generation Partnership Project (3GPP) standards.

In another embodiment of the present invention, device-to-device (D2D) communication has two parts (i) discovery and (ii) scheduling. Since the scheduling process is independent of standardization, 3rd Generation Partnership Project (3GPP) cannot be involved in this part. However, 3rd Generation Partnership Project (3GPP) should take active part in standardizing discovery mechanism including location identification and power control mechanism required to minimize the interference. Apart from this, appropriate performance metrics, and performance targets such as Signal-to-Interference and Noise Ratio (SINR) thresholds/bounds, throughput, number of the plurality of users equipment (UEs) supported, etc. also need to be defined by the standards body. Moreover, Signal-to-Interference and Noise Ratio (SINR) should accept the proposed device-to-device (D2D) communication involving the operators as a separate use-case, which is different from Proximity Services (ProSe) under 3rd Generation Partnership Project (3GPP). The other important aspect of standardization is to support overlapping cellular and device-to-device (D2D) communications over the same resources or RBs. Implementation of the method and system described herein requires standardization involving mobile device manufacturers, cellular operators and regulators. Mobile device manufacturers should support power control, location aware signaling techniques on their devices. Operators should ensure security measures and QoS to the users; Regulators should ensure the received power level required to avoid health hazards, spectrum use and reuse, interference and security etc., such that standardization under 3rd Generation Partnership Project (3GPP) can be performed.

In an exemplary embodiment of the present invention, a single cell scenario is considered where both the transmitter and receiver pair belongs to the same Evolved Node B (eNB), to which device-to-device (D2D) classification rules are applied. In the scenario where the receiver belongs to a different cell, the connection will be treated as a cellular pair only. In this simulation, multiple of hundreds users with random positions are registered to the Evolved Node B (eNB). Among these users some constant number of active connections are scheduled for a particular frame of 60 resource block (RB). The active connections (pair of source and destinations) are then divided into two sets: cellular pairs and device-to-device (D2D) pairs. To reflect a more practical scenario 30% of the total users are device-to-device (D2D) users. Once the cellular users are scheduled to the number of resource block (RB) in the first phase, the device-to-device (D2D) pairs will be scheduled for the same RBs ensuring minimum interference. As per the setup, average number of device-to-device (D2D) users contending for the resources are half of the cellular users. For the simulations, the proposed scheme has randomly selected the number of active cellular as well as active device-to-device (D2D) connections.

In another embodiment of the present invention, the optimization problems is solved using MATLAB simulator. An Long Term Evolution (LTE) framework with 1.4 MHz bandwidth is considered with Trans Time Interval (TTI) or sub-frame length of 1 ms. Each sub-frame is further divided into two slots of duration 0.5 ms each and the system bandwidth is divided into 60 RBs; each RB is 180 kHz bandwidth corresponds to one slot. The plurality of users equipment (UEs) are randomly placed (uniform random) in the cell and are assumed to be static for simulation, while incorporating mobility into simulations can be considered without any difficulty as frame-by-frame scheduling is proposed and GPS locations of the mobile users can be accurately obtained. The plurality of users equipment (UEs) traffic of different sizes are randomly created. Then, the two-phase scheduling scheme is employed and resource block (RB) is allocated to the contending users. The present subject matter has considered SINRth as 6.2 dB and receiving power threshold, Rxth as −75 dBm, SINRlb as 0.5 dB. Sufficient simulation runs have been conducted with 20 different seed values (i.e., different user equipment (UEs) populations) to have a confidence interval of ±2% of the mean value with a confidence level of 95%.

Figure 3:
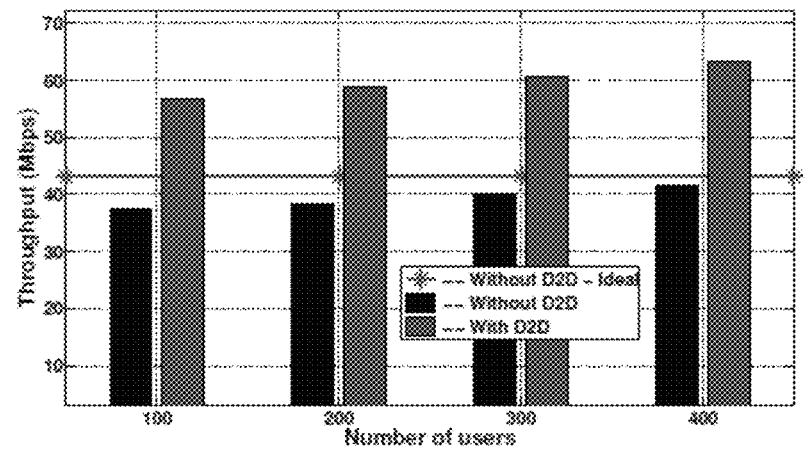
FIG. 3 illustrates an exemplary graph indicating comparison between effective capacity vs. number of connections, according to an embodiment of the present subject matter.

Referring to FIG. 3 illustrates an exemplary graph indicating comparison between effective capacity vs. number of connections, according to an embodiment of the present subject matter.

In another embodiment of the present invention, described herein is the effective capacity of the network with varying number of active connections. It is observed that the effective capacity of the network with device-to-device (D2D) classification and scheduling is substantially higher than that without device-to-device (D2D) classification. Moreover, with increase in number of active connections, effective throughput of the network also increases. This is due to the fact that as the number of resource block (RB) are fixed and with more users available there is a higher possibility of having users with better channel conditions and hence better system throughput. As large number of device-to-device (D2D) pairs always contend for the resource block (RB), our results show significant improvement in throughput in case of device-to-device (D2D) communications.

Figure 4:
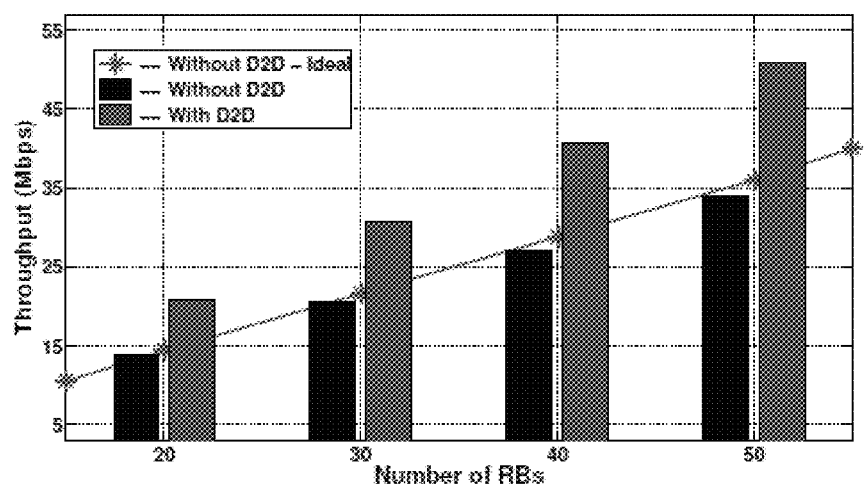
FIG. 4 illustrates an exemplary graph indicating comparison between effective capacity vs. number of resource blocks (RBs), according to an embodiment of the present subject matter.

Referring to FIG. 4 illustrates an exemplary graph indicating comparison between effective capacity vs. number of resource blocks (RBs), according to an embodiment of the present subject matter.

In another embodiment of the present invention, described herein is the effective capacity with varying resource block (RB). In this case, the maximum number of active cellular connections is limited to 120; number of active users as well as device-to-device (D2D) users are randomly selected. It is observed that with varied number of resource block (RB) and fixed number users, device-to-device (D2D) classification and scheduling improves the system throughput significantly and increases with increase of number of resource block (RB).

In an exemplary embodiment of the present invention, the performance of the network with and without device-to-device (D2D) communications is compared with the maximum uplink capacity which can be achieved by the network in the ideal case, without device-to-device (D2D) communications in both (i) variable number of users case as illustrated in FIG. 3 and (ii) variable number of resource block (RB) case as illustrated in FIG. 4. From these figures, it can be observed that using device-to-device (D2D) the throughput achieved can be significantly higher than the ideal cases.

In another embodiment of the present invention, said a test-bed implementation is described. To verify the model, the proposed scheme is also emulated in a lab set-up; wherein wireless ad-hoc networks access points are considered as Evolved Node B (eNB) and android phones are considered as a plurality of users equipment (UEs). Appropriate signaling techniques and power control techniques are implemented in the android phones as well as at the wireless access point and the two-phase scheduling is also implemented at the access point end. For the emulations, a maximum of ten users are considered and out of which 30% of the users can be treated as device-to-device (D2D) users. The plurality of users equipment (UEs) are placed at different distances and based on the Received Signal Strength Indication (RSSI) value, the communicating pairs are classified as device-to-device (D2D) or cellular pairs. Data is collected from the emulated test-bed environment and analyzed for bandwidth utilization, latency, and overall power consumption. From the results it is clear that using device-to-device (D2D) along with cellular communication improves the overall performance and optimizes resource utilization of the system.

Figure 5:
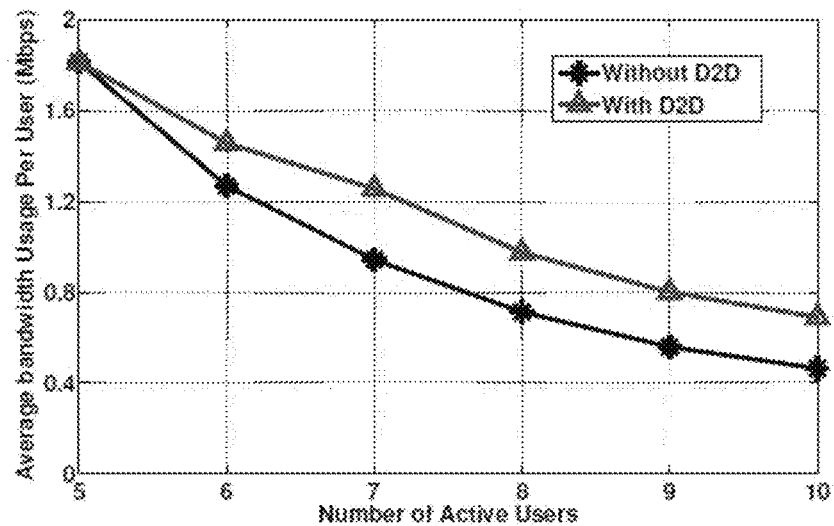
FIG. 5 illustrates an exemplary graph indicating achieved throughput, according to an embodiment of the present subject matter.
Figure 6:
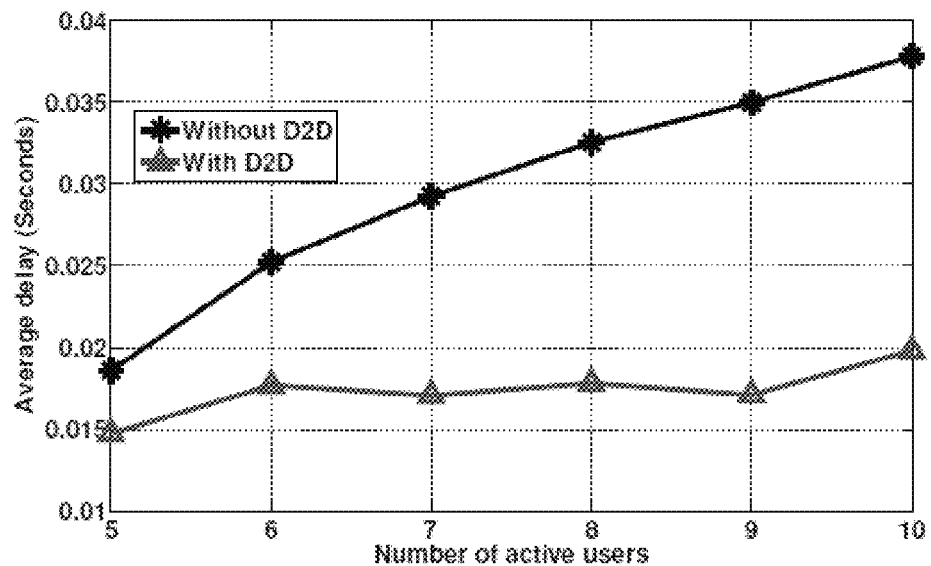
FIG. 6 illustrates an exemplary graph indicating transmission delay, according to an embodiment of the present subject matter.

Referring to FIG. 5 illustrates an exemplary graph indicating achieved throughput, according to an embodiment of the present subject matter and referring to FIG. 6 illustrates an exemplary graph indicating transmission delay, according to an embodiment of the present subject matter. It is observed that with device-to-device (D2D), average bandwidth utilization per user is increased due to the reuse of resource block (RB), and transmission delay (end-to-end delay including scheduling) is reduced due to the direct communications (no downlink communication) as compared to that of without device-to-device (D2D) communication.

We claim:

1. A method for an interference aware optimal device-to-device (D2D) communication and uplink scheduling underlying a Long Term Evolution (LTE) network, said method comprising:
registering a plurality of users equipment (UEs) with a single cell with one Evolved Node B (eNB) over the Long Term Evolution (LTE) network wherein each of the plurality of users equipment (UEs) is capable of transmitting at least one data packet of multiple flows through the Evolved Node B (eNB);
initiating connection by the plurality of users equipment (UEs) with the Evolved Node B (eNB) by starting random access procedure;
discovering device-to-device (D2D) communication between actively connected plurality of users equipment (UEs) by collecting location and channel information of the actively connected plurality of users equipment (UEs) by the Evolved Node B (eNB) through SRS packets;
segregating and classifying the actively connected plurality of users equipment (UEs) in device-to-device and cellular users by the Evolved Node B (eNB) by utilizing collected location and channel information of the actively connected plurality of users equipment (UEs); and scheduling two-phase interference aware optimal uplink for the device-to-device communication for the actively connected device-to-device (D2d) users and cellular users segregated out of the plurality of users equipment (UEs) by the Evolved Node B (eNB), underlying the Long Term Evolution (LTE) network, wherein scheduling the two-phase interference aware optimal uplink for the device-to-device communication further comprises:
scheduling cellular users for plurality of Resource Blocks (RBs) set in a Long Term Evolution (LTE) frame, and
scheduling valid and non-interfering device-to-device (D2D) users along with the already scheduled cellular users for the plurality of Resource Blocks (RBs) with no or minimal total interference, wherein interference by an uplink cellular user at a device-to-device (D2D) receiver and interference at the Evolved Node B (eNB) by a device-to-device (D2D) transmitter are below maximum Signal-to-Interference and Noise Ratio (SINRlb).

2. The method as claimed in claim 1, wherein the plurality of users equipment (UEs) is selected from a group comprising of static or mobile user equipment.

3. The method as claimed in claim 1, wherein mode of communications between the actively connected plurality of users equipment (UEs) is selected from a group comprising directly with each other and through the Evolved Node B (eNB).

4. The method as claimed in claim 1, further comprises of collecting one or more request messages from the plurality of users equipment (UEs) by the Evolved Node B (eNB).

5. The method as claimed in claim 1, wherein the one or more request messages from the plurality of users equipment (UEs) are collected by the Evolved Node B (eNB) using contention based techniques.

6. The method as claimed in claim 1, wherein the scheduling the two-phase interference aware optimal uplink for device-to-device communication underlying the Long Term Evolution (LTE) network is enabled by a Long Term Evolution (LTE) uplink Frequency Division Duplexing (FDD) frame structure.

7. The method as claimed in claim 6, wherein the Long Term Evolution (LTE) uplink Frequency Division Duplexing (FDD) frame structure further comprises of dividing a frame length in to a plurality of sub-frames; dividing the plurality of sub-frames into at least two slots; and dividing available system bandwidth into a plurality of Resource Blocks (RBs) corresponds to at least one slot.

8. The method as claimed in claim 1, wherein a wireless channel between the plurality of users equipment (UEs) and the Evolved Node B (eNB) is frequency selective and time varying in nature and is modeled through Log-normal shadowing and Rayleigh fading.

9. The method as claimed in claim 1, wherein the plurality of users equipment (UEs) reports uplink channel condition using a Sounding Reference Signal (SRS).

10. The method as claimed in claim 1, further comprises of assigning adaptive modulation and coding rates to each of the plurality of users equipment (UEs) by the Evolved Node B (eNB) based on a signal-to-interference-plus-noise ratio (SINR) received at the Evolved Node B (eNB).

11. The method as claimed in claim 1, further comprises of facilitating device-to-device (D2D) communications under 3rd Generation Partnership Project (3GPP).

12. A system for scheduling an interference aware optimal uplink for device-to-device (D2D) communication underlying a Long Term Evolution (LTE) network, said system comprising a single cell with one Evolved Node B (eNB) communicatively coupled to a plurality of users equipment (UEs) over the Long Term Evolution (LTE) network adapted for executing:
registering a plurality of users equipment (UEs) with the single cell with one Evolved Node B (eNB) over the Long Term Evolution (LTE) network wherein each of the plurality of users equipment (UEs) is capable of transmitting at least one data packet of multiple flows through the Evolved Node B (eNB);
initiating connection by the plurality of users equipment (UEs) with the Evolved Node B (eNB) by starting random access procedure;
discovering device-to-device (D2D) communication between actively connected plurality of users equipment (UEs) by collecting location and channel information of the actively connected plurality of users equipment (UEs) by the Evolved Node B (eNB) through SRS packets;
segregating the actively connected plurality of users equipment (UEs) in device-to-device and cellular users by the Evolved Node B (eNB) by utilizing collected location and channel information of the actively connected plurality of users equipment (UEs); and
scheduling two-phase interference aware optimal uplink for device-to-device communication for the actively connected device-to-device (D2d) users and cellular users segregated out of the plurality of users equipment (UEs) by the Evolved Node B (eNB), underlying the Long Term Evolution (LTE) network, wherein scheduling the two-phase interference aware optimal uplink for device-to-device communication further comprises scheduling cellular users for the plurality of Resource Blocks (RBs) set in the Long Term Evolution (LTE) frame, and scheduling valid and non-interfering device-to-device (D2D) users along with the already scheduled cellular users for the plurality of Resource Blocks (RBs) with no or minimal total interference, wherein interference by an uplink cellular user at a device-to-device (D2D) receiver and interference at the Evolved Node B (eNB) by a device-to-device (D2D) transmitter are below maximum Signal-to-Interference and Noise Ratio (SINRlb).

13. The system as claimed in claim 12, wherein the plurality of users equipment are registered to the Evolved Node B (eNB).

14. The system as claimed in claim 12, wherein the plurality of users equipment (UEs) is selected from a group comprising of static or mobile user equipment.

15. The system as claimed in claim 12, wherein mode of communications between the actively connected plurality of users equipment (UEs) is selected from a group comprising directly with each other and through the Evolved Node B (eNB).

16. The system as claimed in claim 12, wherein the scheduling the two-phase interference aware optimal uplink for device-to-device communication underlying the Long Term Evolution (LTE) network is enabled by a Long Term Evolution (LTE) uplink Frequency Division Duplexing (FDD) frame structure.

17. The system as claimed in claim 16, wherein the Long Term Evolution (LTE) uplink Frequency Division Duplexing (FDD) frame structure further comprises of dividing a frame length in to a plurality of sub-frames; dividing the plurality of sub-frames into at least two slots; and dividing available system bandwidth into a plurality of Resource Blocks (RBs) corresponds to at least one slot.

18. The system as claimed in claim 12, further comprises of assigning adaptive modulation and coding rates to each of the plurality of users equipment (UEs) by the Evolved Node B (eNB) based on a signal-to-interference-plus-noise ratio (SINR) received at the Evolved Node B (eNB).

* * * * *